(12) United States Patent
Lando

(10) Patent No.: US 9,039,168 B1
(45) Date of Patent: May 26, 2015

(54) EXPANDABLE EYEWEAR WITH FLEXIBLE BAND

(71) Applicant: Clic Goggles, Inc., Corte Madera, CA (US)

(72) Inventor: Ron Lando, Corte Madera, CA (US)

(73) Assignee: Clic Goggles, Inc., Corte Madera, CA (US)

( * ) Notice: Subject to any disclaimer, the term of this patent is extended or adjusted under 35 U.S.C. 154(b) by 93 days.

(21) Appl. No.: 14/080,365

(22) Filed: Nov. 14, 2013

(51) Int. Cl.
G02C 3/00 (2006.01)

(52) U.S. Cl.
CPC ..................... G02C 3/003 (2013.01)

(58) Field of Classification Search
CPC .............. G02C 3/003; G02C 3/006
USPC ........ 351/156, 157, 124, 41; 2/445, 448, 454, 2/10; 24/3.3
See application file for complete search history.

(56) References Cited

U.S. PATENT DOCUMENTS

| | | | |
|---|---|---|---|
| 6,253,388 B1 * | 7/2001 | Lando | 2/445 |
| 7,931,366 B1 * | 4/2011 | Lando | 351/156 |
| 8,025,396 B1 * | 9/2011 | Power | 351/124 |
| 8,092,009 B2 * | 1/2012 | Williams | 351/156 |

* cited by examiner

Primary Examiner — Hung Dang
(74) Attorney, Agent, or Firm — Bay Area Technology Law Group PC

(57) ABSTRACT

The present eyewear includes a pair of lenses, a pair of releasable connectors connected to respective inner ends of the lenses, temples pivotally connected to respective outer ends of the lenses and a rigid strap connected between the rear ends of the temples. The strap is further characterized as having parallel legs connected to the rear ends of the temples, transition segments having a first shape extending from the substantially parallel legs to an arc-shaped base which extends along the back of the user's head when worn. The transition segments are bendable by a user causing them to change from their first shape to a second shape and to maintain the second shape unless bent further by the user.

6 Claims, 1 Drawing Sheet

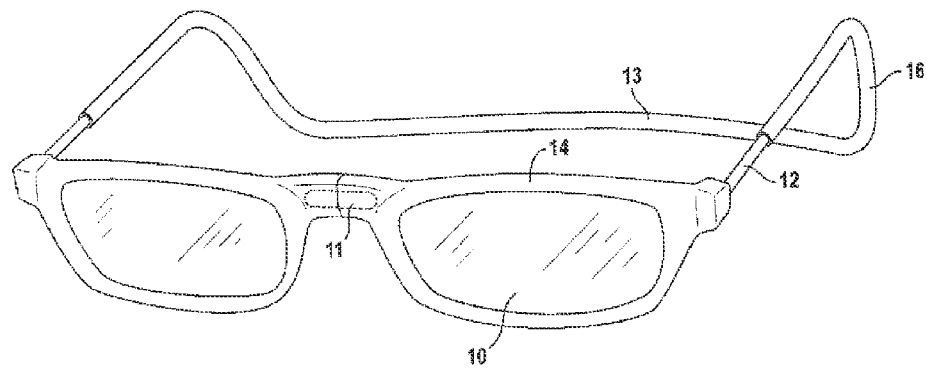
FIG. 1
(Prior Art)
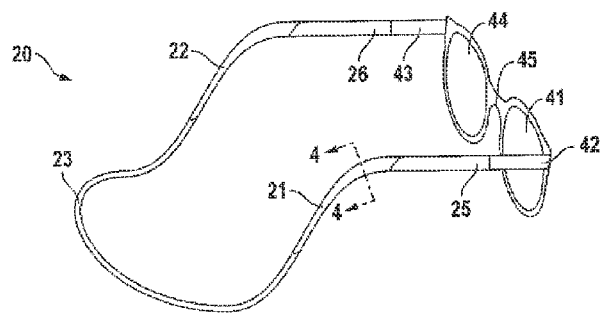
FIG. 2
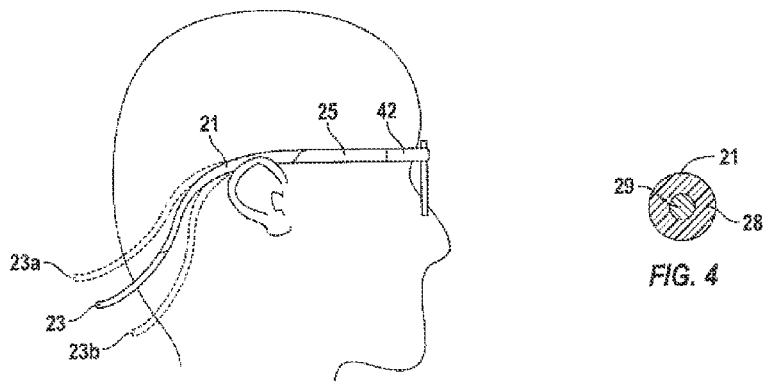 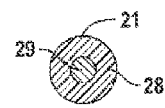
FIG. 3
FIG. 4

EXPANDABLE EYEWEAR WITH FLEXIBLE BAND

TECHNICAL FIELD

Present invention deals with eyewear having a snap-together bridge feature.

BACKGROUND OF THE INVENTION

Applicant is the owner of U.S. Pat. Nos. 6,253,388 and 7,931,366 The invention disclosed and claimed in the '388 patent involved eyewear comprising a pair of lenses, releasable connectors connecting the respective inner ends of the lenses, a pair of temple pieces pivotable to respective outer ends of the lenses and a rigid strap attached to rear ends of the temple pieces including an arc-shaped based bridging the parallel legs. The strap was taught to be positioned below the lenses so as not to interfere with, for example, the hairdo of a user or helmet or hat worn by a user. The inner ends of the lenses were taught to be releasably secured to each other by connectors, preferably, magnets. To position the eyewear, the lenses are first separated from each other and pivoted outwardly. The strap is then wrapped around the back of a user's head and the lenses pivoted toward each other and secured together in front of the user's eyes. The lenses were taught to be instantly separable to facilitate putting on and taking off the eyewear and instantly connectable for a secure and accurate fit.

Applicant's U.S. Pat. No. 7,931,366 represented an improvement over its '388 patent by calling for a telescoping segment located within the arc-shaped base of the eyewear's strap to selectively alter the length of the arc-shaped base for modifying the spacing between the substantially parallel legs of the rigid strap to adjust the strap to varying widths of a user's head. Although doing so greatly expanded the flexibility of applicant's eyewear enabling it to be accommodated by user's of different head size, it was determined by applicant that its eyewear could benefit yet further by additional modification.

It is noted that the arc-shaped base of applicant's eyewear is springy enough to be bendable when flexed and rebounding when released, yet tends to maintain its configured orientation thus requiring the user to adapt to the eyewear rather than enabling the eyewear to adapt to the user For example, if the hair style of the user was configured so as to interfere with the eyewear's arc-shaped base, the eyewear could fail to conform to the user's needs. This could cause the releasable connectors to snap apart and resist joinder thus making the eyewear difficult if not impossible to employ. In addition, some users may have head shapes which are out of the ordinary again causing the arc-shaped rigid strap to cause the eyewear to be ill-fitting.

It is thus an object of the present invention is to provide eyewear having a rigid strap which is capable of changing its orientation to accommodate the needs of the diverse users.

These and further objects will be more readily apparent when considering the following disclosure of amended claims.

SUMMARY OF THE INVENTION

Eyewear comprising a pair of lenses and a pair of releasable connectors connected to respective inner ends of said lenses or to flames that support the lenses. The connectors are securely connectable and releasable from each other. A pair of temples are connected to respective outer ends of said lenses or against the frames that support them and a strap is connected between rear ends of said temples, said strap being rigid enough to generally retain its shape when said connectors are released and springy enough to be bendable when flexed and rebounding to its original shape. The strap is mounted with substantially parallel legs being connected to rear ends of said temples and transition segments having a first shape extending from said substantially parallel legs to an arc-shape base extending to the back of a user's head when worn. As a preferred embodiment, the transition segments comprise a wire core, the wire core being bendable by a user causing the transition segments to change from its first shape to a second shape and to maintain its second shape unless bent further by a user

BRIEF DESCRIPTION OF THE DRAWINGS

FIG. 1 is a perspective view of eyewear made the subject of U.S. Pat. No. 6,253,388.

FIG. 2 is a perspective view of the eyewear of the present invention

FIG. 3 is a side view of the eyewear of the present invention being employed by a user.

FIG. 4 is a cross-sectional view of the eyewear of the present invention taken along line 4-4 of FIG. 2.

DETAILED DESCRIPTION OF THE INVENTION

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention it is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

As noted previously, applicant has taught, in its U.S. Pat. No. 6,253,388, eyewear which includes lenses 10 mounted in respective frames 14. Connectors 11 are preferably attached to the inner ends of frames 14 or if the frames are eliminated to lenses 10 themselves. Temples 12 are preferably telescoping for fitting different wearers. Without this feature, an attempt to wear applicant's eyewear with snap-together bridge could, and oftentimes does, inadvertently lose connection at the bridge resulting in the lenses separating.

As is further noted in applicant's '388 patent, a strap is connected to temples pieces 12 which extends therefrom, progressively to downward segment 16 and connecting to an opposite segment and temple piece through the use of U-shaped base 13. Lenses 10 contained in frames 14 releasably connect to one another at the bridge of a user's nose generally through the employment of magnets 11 as further discussed in the '388 patent.

When employed by a user, it has been found that the strap, particularly at U-shaped based 13 does not always reside in an ideal location at the back of the user's head either because the user might have a particular hair style which interferes with this rigid element or a user's head might be of a shape which does not ideally conform to the strap. A user may even be wearing a hat, cap or visor which could again interfere with the ideal employment of such eyewear. The present invention is intended to improve upon applicant's prior eyewear, again, as best described in applicant's U.S. Pat. Nos. 6,253,388 and 7,931,366, the disclosures are incorporated herein by reference Applicant's invention can best be appreciated in reference to FIGS. 2, 3 and 4 Specifically, eyewear 20 is provided with a pair of lenses 41 and 44 including a pair of releasable connectors 45 connecting the respective inner ends of lenses 41 and 44 (or of frame members when employed), connectors 45 being securely connectible together and releasable from each other. A pair of temples 42 and 43 are connected to respective outer ends of lenses 41 and 44 or their frames. A strap is connected between the rear ends of temples 42 and 43, the strap being rigid enough to generally retain its shape when connectors 45 are released and springy enough to be bendable when flexed and rebounding when released.

As shown, the strap is generally U-shaped having substantially parallel legs 25 and 26 being connected to rear ends of temples 42 and 43, respectively. When worn, arc-shaped base 23 extends along the back of the user's head As noted previously, the positioning of arc-shaped base 23, in applicant's prior iterations of its eyewear, could not be altered and thus oftentimes would interfere with the hairdo or head shape of a user making such eyewear difficult to employ causing undue pressure on connector 45 and, in extreme cases, causing connector 45 to release, much to the dismay of the user.

The present invention includes transition segments 21 and 22 having a first shape and extending from substantially parallel legs 25 and 26 which in turn are connected to the back ends of temple pieces 42 and 43. Arc-shaped base 23 connects to both transition segments 21 and 22 for extending along the back of a user's head when worn, best illustrated in reference to FIG. 3.

Transition segments 21 and 22 are bendable by a user for causing said transition segments to change from a first shape to a second shape and to maintain said second shape unless bent further. This alters the positioning of arc-shaped base 23 up or down noting in FIG. 3 that arc-shaped base 23 can be positioned as shown by phantom lines 23A and 23B.

As a preferred embodiment, transition segments 21 and 22 can comprise wire core 29 composed of a metal which retains its shape once that shape is induced by bending wire core 29 by a user. It is has been found that materials such as a nickel-silver alloy as well as copper are sufficiently malleable to perform the function described herein. Ideally, wire core 29 is surrounded by sheath 28 which can be rubber or plastic, that is, composed of a material which will flex without breaking and which will provide comfortable points of contact at the sides of a user's head.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired the limit the invention to the exact construction, dimensions, relationships, or operations as described. Various modifications, alternative constructions, changes and equivalents will readily occur to those skilled in the art and may be employed as suitable without departing from the true spirit in the art and may be employed as suitable without departing from the true spirit and scope of the invention Such changes might involve alternative materials, components, structural arrangements, sizes, shapes, forms, functions, operational features or the like. Therefore, the above description and illustration should not be considered as limiting the scope of the invention, which is defined by the appended claims.

The invention claimed is:

1. Eyewear comprising:

A pair of lenses;

a pair of releasable connectors connected to respective inner ends of said lenses, said connectors being securely connectable together and releasable from each other;

a pair of temples connected to respective out ends of said lenses; and a strap connected between rear ends of said temples, said strap being rigid enough to generally retain its shape when said connectors are released and springy enough to be bendable when flexed and rebounding when released, said strap having substantially parallel legs being connected to rear ends of said temples, transition segments having a first shape and extending from said substantially parallel legs to an arc-shaped base extending to the back of a user's head when worn, said transition segments comprising a wire core, said wire core being bendable by a user causing said transition segments to change from said first shape to a second shape and to maintain said second shape unless bent further by a user.

2. The eyewear of claim 1 wherein said transition segments comprise a core of malleable wire surrounded by a sheath.

3. The eyewear of claim 2 wherein said sheath comprises rubber or plastic.

4. The eyewear of claim 2 wherein said core comprises a malleable wire selected from the group consisting of nickel-silver alloy and copper.

5. Eyewear comprising:

A pair of lenses;

a pair of releasable connectors connected to respective inner ends of said lenses, said connectors being securely connectible together and releasable from each other;

a pair of temples connected to respective outer ends of said lenses; and a strap connected between rear ends of said temples, said strap being rigid enough to generally retain its shape when said connectors are released and springy enough to be bendable when flexed and rebounding when released, said strap having substantially parallel legs being connected to rear ends of said temples, transition segments having a first shape and extending from said substantially parallel legs to an arc-shaped base extending along the base of a user's head when worn, said transition segments comprising a wire core, said wire core being bendable by a user causing said transition segments to change from said first shape to a second shape and to maintain said second shape unless bent further by a user for altering the position of said arc-shaped base at the back of said user's head.

6. Eyewear comprising:

A pair of lenses;

a pair of releasable connectors connected to respective inner ends of said lenses, said connectors being securely connectible together and releasable from each other;

a pair of temples connected to respective outer ends of said lenses; and a strap connected between rear ends of said temples being rigid enough to generally retain its shape when said connectors are released and springy enough to be bendable when flexed and rebounding when released, said strap comprising substantially parallel legs being connected to rear ends of said temples, transition segments having a first shape extending from said substantially parallel legs to an arc-shaped base extending along the back of the user's neck when worn, said transition segments being bendable by a user causing said transition segments to change from said first shape to a second shape and to maintain said second shape unless bent further by said user for altering the position of said arc-shaped base at the back of said user's head.

* * * * *